L. SIMMONS.
FLUSHING APPARATUS.
APPLICATION FILED JUNE 15, 1911.
1,008,928.
Patented Nov. 14, 1911.
2 SHEETS—SHEET 2.
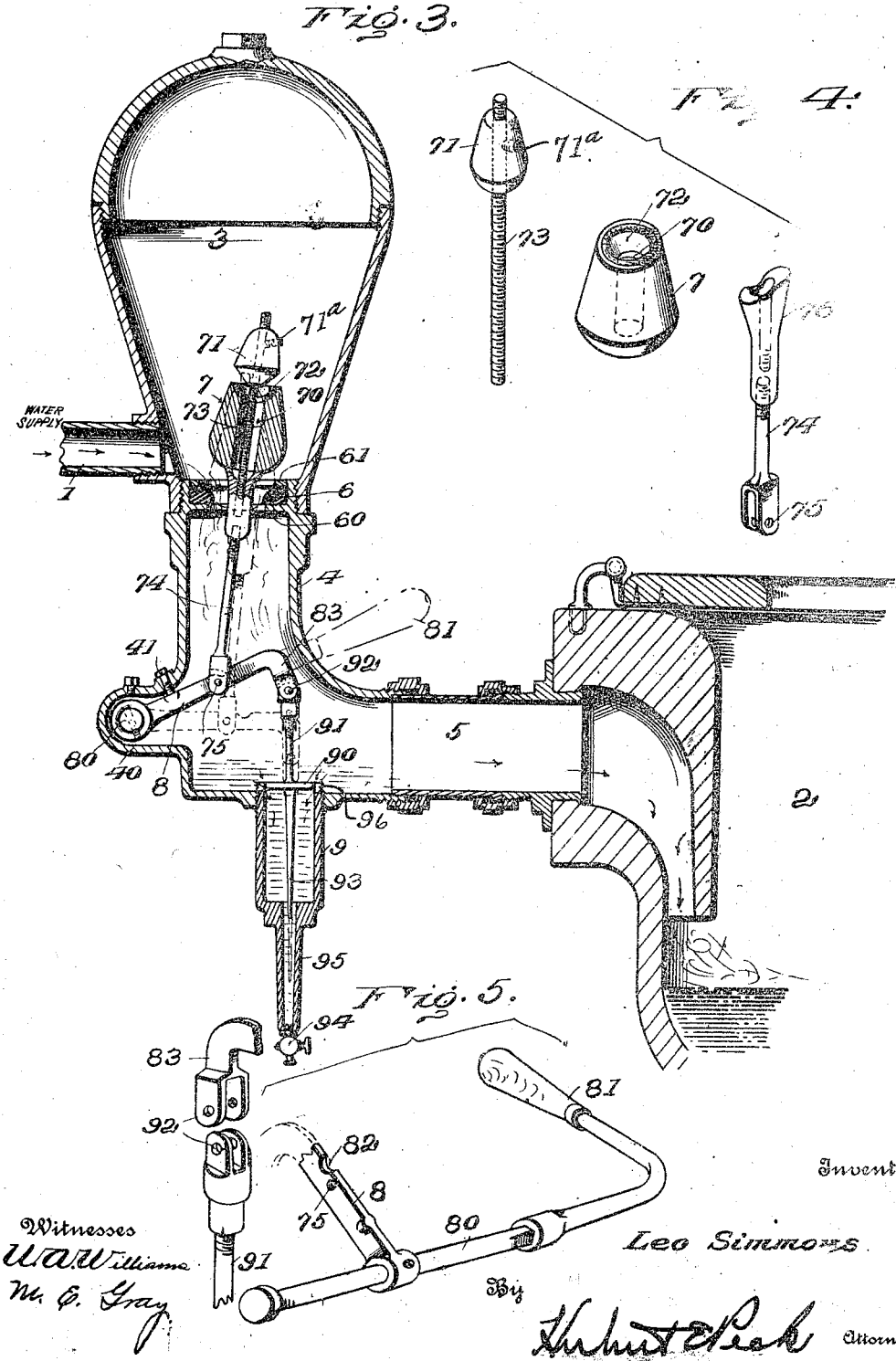

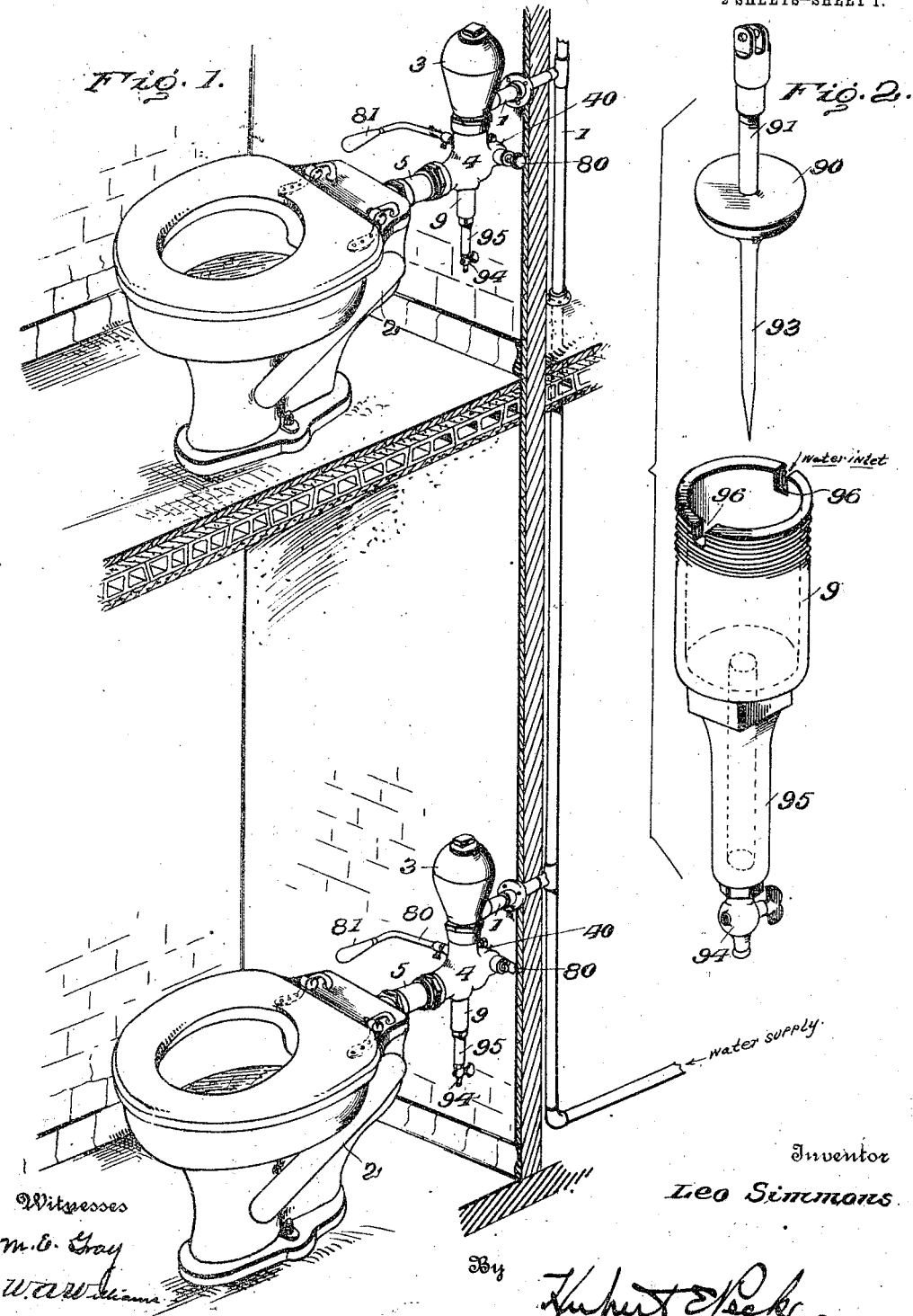

UNITED STATES PATENT OFFICE.

LEO SIMMONS, OF WASHINGTON, DISTRICT OF COLUMBIA.

FLUSHING APPARATUS.

1,008,928.  Specification of Letters Patent.  Patented Nov. 14, 1911.

Application filed June 15, 1911. Serial No. 633,366.

*To all whom it may concern:*

Be it known that I, LEO SIMMONS, a citizen of the United States, residing at Washington, District of Columbia, have invented certain new and useful Improvements in Flushing Apparatus; and I do hereby declare the following to be a full, clear, and exact description of the invention, such as will enable others skilled in the art to which it appertains to make and use the same.

This invention relates to certain improvements in flushing apparatus for closets, and other purposes; and the objects and nature of my invention will be readily understood by those skilled in the art in the light of the following explanation of the accompanying drawings showing what I now consider to be my preferred embodiment from among other formations and arrangements within the spirit and scope of my invention.

The invention consists in certain novel features in construction and in combinations and arrangements as more fully and particularly set forth hereinafter.

Referring to the accompanying drawings:—Figure 1, is a perspective view showing several closet bowls equipped with flushing apparatus in accordance with my invention. Fig. 2, is a detail perspective view of certain parts detached and separated from coöperating elements. Fig. 3, is a vertical sectional view showing a portion of a bowl and a flushing apparatus in accordance with my invention, the valves thereof being shown in opened or flushing adjustment. Fig. 4, is a detail perspective view of certain detached parts. Fig. 5, is a detail perspective view of portions of the operating mechanism detached.

In the drawings, I show a flushing apparatus constructed in accordance with my invention and coupled to receive water under pressure from any suitable source through water supply pipe 1, and to deliver the same for flushing any suitable receptacle, such as closet bowl 2.

In the specific example illustrated, the flushing apparatus comprises an upright dome or pressure chamber 3, mounted on and rising from the upper end of the vertical arm of an elbow-like casing section 4, having its horizontal or delivery end connected to deliver water into and for flushing the bowl 2. The horizontal end of the elbow can be coupled and connected to the bowl in any suitable manner or by any suitable means, although in this instance I show pipe section 5, and appropriate coupling for the purpose. The lower end of the dome is coupled to and receives the upper open end of the elbow. At a suitable point, such as the upper end of the elbow, I provide any suitable internal annular valve seat. This valve seat can be formed by a leather, or other suitable cushioning material, washer 6, held to an annular ledge 60, integral with the elbow casing by a threaded ring 61, screwing down on the washer and maintaining the position thereof.

The water supply pipe 1, opens laterally into the lower end of the dome just above and to discharge the water transversely across the valve seat, although I do not wish to limit all features of my invention to such arrangement.

The outlet port (surrounded by valve seat 6) from the dome is normally sealed by a valve device consisting of two superimposed coöperating valves 7, 71, arranged one on or within the other. The main valve 7, is usually formed in one piece of suitable heavy durable material, such as metal. In the example illustrated, this valve has a rounded or convex lower end to rest on the valve seat 6, and close the port therethrough. The valve is usually elongated and reduced or tapered vertically so as to extend a substantial distance upwardly above said seat and into the dome directly opposite the water inlet pipe 1, and is formed with a vertical water passage or duct 70, extending longitudinally and centrally therethrough. This passage 70, is of substantial capacity, in fact, I usually form the same of a diameter equal to one third more or less, of the diameter of the outlet port surrounded by seat 6. I usually provide the small upper end of valve 7, with a central depression or socket forming a valve seat 72, around the upper end of water passage 70, to receive the upper quick-opening and slow-closing or relief valve 71. This valve 71, is usually of the shape about as shown having an enlarged rounded lower end from which the valve tapers and reduces upwardly. This relief valve is normally seated in said socket or depression sealing and closing the water passage 70. The valve 71, is controlled by and secured to a stiff lifting rod comprising uprights sections 73, 74 and 76.

Rod section 73 is of a reduced size with respect to, and depends loosely through, the passage 70, and at a point below valve 7 is coupled to rod section 74, at its lower end pivotally joined at 75, to a vertically swingable lifting arm 8.

In the specific example illustrated, the rod section 73, is joined to and in rigid upward continuation of the rod section 74, through the medium of a sleeve or block 76, having an enlarged upper end forming a lifting and upholding shoulder to engage the lower end of the valve 7, and lift and support the same from its seat. The lifting shoulder 76, is normally located a distance below the lower end of valve 7, that is, when the valve 7 is in normal position on its seat 6, and the valve 71, is in normal position sealing passage 70.

In the specific example illustrated, the elbow casing 4, is formed with a rearwardly projecting hollow protuberance or enlargement 40, through which horizontal rock shaft 80, transversely extends. The lifting arm 8, is fixed on said shaft and extends forwardly therefrom, stop 41, being provided, if so desired, to limit the upward movement of said arm. The rock shaft is suitably journaled or mounted in the walls of enlargement 41, and is provided with any suitable operating or actuating mechanism. For instance, I show said shaft provided with an exterior conveniently located vertically swingable actuating handle 81. The lower end of the upright lifting rod is usually bifurcated to straddle the lever arm 8, and is pivotally joined thereto by a horizontal transverse pivot to permit swing of said rods and the valves carried thereby in a vertical plane toward and from the inlet pipe 1, and to hold the same against lateral swing or deflection from said vertical plane, although I do not wish to so limit all features of my invention.

When the valves are in normal closed position, the lifting rod is approximately vertical and centrally arranged in the upright portion of the elbow casing, and the lever arm 8, is approximately horizontal, as indicated by dotted lines, Fig. 3. When the shaft 80, is rocked (by lifting the handle 81, or by other means) to elevate the lever arm 8, the initial upward swing of said arm raises the lift rod and elevates the relief valve 71, from its seat, to permit relief of the excessive pressure in the dome by flow of water through the passage 70. Continued upward movement of the lift rod brings the stop or shoulder 76, thereof against the lower end of the main valve 7, and said valve is thereupon rocked or tilted and lifted from its seat to permit the full flushing flow of water through the port surrounded by valve seat 6. The lever arm 8, swings vertically on a fixed center (axis of shaft 80) and hence in moving upwardly carries the lower end of the lifting rod upwardly and rearwardly causing said rod to assume a tilting position in lifting, see dotted lines Fig. 3, and thereby rocks or tilts the valve 70 7, from its seat in lifting the same, and the inrush of water through pipe 1, into the dome and laterally against valve 7, is in a direction to aid in this tilting action. By thus providing a tiltable valve and operating connections, in conjunction with the relief valve, the main valve can be easily rocked and lifted from its seat by the application of slight non-objectionable force to the handle 81, or other means for rocking lever arm 8, as will be readily understood by those skilled in the art.

When the parts are in elevated position, as shown in Fig. 3, the lifting rod carrying the valve is held in tilted position and against dropping against the wall of the dome or the valve seat, by the edge of the bifurcated end of the lower section 74, of the rod, engaging the edge of a notch or recess 82, in the arm 8.

I preferably provide means whereby the position of the valve 71, can be varied longitudinally of the lifting rod and also whereby the position of the block or lifting stop 76, can be varied longitudinally of said rod. For instance, I show the rod section 73, longitudinally threaded and screwed through a threaded hole in valve 71, as well as into a threaded socket in block 76. If so desired, the valve 71, can be locked to said rod in the desired adjustment by set screw 71ᵃ. The rod section 74, can also, if so desired, be threaded to screw into a longitudinal threaded socket in block 76, for longitudinal adjustment. By this arrangement, or the equivalent thereof, the relative positions of the block 76 with respect to valve 71, or with respect to valve 7, can be easily regulated or adjusted in setting up the apparatus to accord with various conditions, such as pipes of different capacities, or to increase or diminish the length of time in which the valve is to close. In order to control the closing action of the duplex valve, i. e. the two valves 7, 71, I provide an open-top cylinder 9, depending from the lower portion of the elbow casing 4, and at its top opening into the interior thereof to receive water therefrom, and in this cylinder I arrange a loosely fitting vertically-movable horizontally-disposed disk 90, having a vertical central stem 91, rigid therewith and rising therefrom and at its upper end pivotally joined to the forwardly projecting downturned end 83, of the lever arm 8, by transverse horizontal pivot 92. If so desired, the disk can be provided with a rigid central depending tapered guide stem 93, depending and vertically and laterally movable in a guide socket or way 95, depending from the otherwise closed lower end of the cylinder and at the lower end terminating in a drain cock 94, through which sediment and mud can be drained from the cylinder.

The disk 90, fits loosely in the cylinder to permit slow passage of water therearound and the edge of the disk is usually rounded or longitudinally tapered to reduce to the minimum possibility of friction with the wall of the cylinder and to avoid wedging of the disk in the cylinder should the disk rock or tilt while reciprocating therein with the rise and fall of the lever arm 8, and due to the swinging movement of said arm, although the extension of the arm beyond the lifting rod and its goose-neck or depending end formation (see 83) where pivoted to stem 91, reduces lateral movement of the stem to the minimum.

The term "disk" employed herein to designate the dash pot piston that causes the slow closing movement of the valves, is not used in a restricted sense to draw a distinction between a disk and a piston.

Usually the upper end of the cylinder is externally threaded to screw into a tapped hole in the bottom wall of the casing 4. Also, the upper open end of the cylinder can be notched, at 96, for free passage of the water to and from the cylinder and past the disk 90, when said disk is about in the position shown by Fig. 3.

To open the duplex valve to flushing position, it is merely necessary to raise the handle 81, approximately to its limit of movement against stop 41, and then release the handle, whereupon the disk 90, will uphold the valve, the necessary length of time for a full flushing flow of water, before the valve is permitted to fully close. The disk 90, slowly settles in the cylinder 9, under the action of gravity and hence provides by exceedingly simple and efficient means for the necessary slow closing movement of the valve. The main valve first drops to its seat and then the relief valve gradually settles down to its seat, but before doing so permits the necessary flow of water through passage 70, after valve 7, has seated, to provide the desired quantity of water in the bowl for sealing and sanitary purposes.

My improved flushing apparatus can be coupled direct to the water supply pipe and will properly operate without adjustment, special tanks or other adjuncts, at any of the pressures to which the ordinary urban water supply systems are subjected. It is well known that city water supply systems are subject to widely varying pressures between the hours of greatest and least water consumption, and that the flushometers heretofore employed have hence required various means, such as tanks, to provide water at uniform pressures for flushing purposes, or else required frequent adjustment as the water pressure varied and hence necessitated the almost daily attention of a plumber or other person sufficiently skilled to make the necessary adjustments. Furthermore, many of the flushometers heretofore provided are adapted for use only with special arrangements and sizes of pipes. In other words, the house water supply system must be designed and arranged therefor. Certain flushometers are subject to objectionable hammering; others are so constructed as not to be adapted for ordinary domestic use because of the great pressure and power necessary to operate the same; and others are too complicated in the matter of number and formation of parts and adjustments to be durable and hence require the frequent services of a plumber. In fact, to the best of my knowledge, information and belief, there is not now on the market a flushometer or direct connected flushing apparatus adapted for general domestic use at the greatly varying pressures of water supply systems and which does not require frequent adjustment or the use of tanks.

My flushing apparatus can be applied to any house water supply pipes and when properly adjusted thereto does not require further adjustment or attention except for repairs. When the apparatus is applied, the lifting rod section 76, will be adjusted according to the size or capacity of the water supply pipe 1, and then the valve 71, will be correspondingly adjusted to maintain the fixed distance between the same and the lifting shoulder of rod section 76. For an inch or inch and a quarter supply pipe 1, the section 76, will be longitudinally adjusted to such a distance from the lever 74, that the path of movement of the valve 7, from completely open to closed position, will be of sufficient length to provide for a full flushing flow of water while the valve is closing. For say, a three quarters of an inch supply pipe 1, the rod section 76, would be adjusted upwardly so as to be a greater distance from lever 8, than where the supply pipe is of larger capacity, and hence increase the length of the path of movement of the valve 7, and the length of time during which the flushing water is permitted to flow while said valve is closing. In any event the path of movement of the valve 7, is comparatively short with respect to the path of movement of the controlling disk 90, the length of the last named path being several times that of the first named path.

It will be noted that the upward movements of the arm 8, lifting rod 74, and disk 90, are limited by the stop 41, while these elements are limited in their downward movements by the engagement of the valves 7 and 71, with their respective seats. The adjustment of the elements 71, 76, to raise the limit of upward movement of the valve 7, does not change the limits of upward movement of the rod 74, lever 8, and disk 90, but does lower the limits of downward movement of these parts, for by the time valve 7, after an opening movement, has reached its closed position, these parts have moved downwardly to lower positions than they occupied before said upward adjustment of elements 71, 76.

By providing the centrally depressed valve seat in the upper end of loosely confined valve 7, the rounded lower end of relief valve 71, carried by the tiltable lifting rod movable laterally in passage 70, can readily seat and center itself and can readily rock or tilt in opening, and can straighten and center the main valve as the relief closes down thereon.

Certain advantages are attained by providing the cushioning valve seat 6, supported by a fixed part of the casing, inasmuch as the enlarged rounded hard lower end of the vertically elongated loosely confined valve 7, can readily rock thereon in opening, and in closing readily seats, adjusts and centers thereon without positive guiding and holding means. By this specific arrangement wear on the washer forming the seat is reduced to the minimum, as the rounded end of the valve merely tends to compress the washer and there is no tendency to cut the same.

Advantages are attained, in the specific embodiment illustrated by employing the vertically elongated gravity valve 7, having a rounded lower end, the valve tapering and reducing upwardly from its lower end so that the water offers a minimum resistance against the opening movement of the valve. The rod 73, is of a reduced size with respect to the water passage 70, through valve 7, and the valve is thus but loosely confined by said rod and is free to rock laterally independently thereof while the rod is free to move laterally within the valve.

Comparatively slight pressure is needed to raise the relief valve the hardly perceptible distance necessary to permit initial escape of water through the passage 70, to reduce the pressure on valve 7. The relief valve is rendered easy to initially lift because the valve and lifting rod are free to tilt laterally and are not guided or confined, and because of the absence of closely fitting parts and consequent friction resisting movement thereof. Furthermore, the facts that the valve is free in the comparatively large space above and around the valve in dome 3, and is formed tapering and reducing upwardly from its rounded lower end, all contribute in reducing the force necessary to lift the valve, and add to the simplicity, reliability and durability of the apparatus.

The metal disk 90, in the open-top cup or dash pot cylinder 9, does not materially resist the opening movements of the relief and main valves, as said disk is so loosely arranged in its cylinder as to move therein without objectionable friction and to permit easy upward movement of the disk and as there is no pressure in the empty casing into which the cylinder opens, to resist upward movement of the disk and the weight of the free water on the disk to be lifted is of no consequence.

The stem or pin 93, depending into the reduced depending pocket 95, serves to prevent sediment such as mud, packing and caking in the cylinder below the disk and interfering with the free downward movement thereof. This stem 93, is usually tapered down to a point to work in any possible collection of sediment and keep the same stirred up so as to settle in the pocket for discharge through the drain cock. If the disk should be elevated from its cylinder and above the open end thereof, through improper adjustment of the stop 41, the stem 93, in the reduced pocket 95, will serve to guide the disk into the open end of the cylinder as the disk drops by gravity under the weight of the heavy valve 7, and the handle 81.

The apparatus of my invention will properly operate and provide the necessary flushing water without adjustment, at the very low pressure of some municipal water supply systems, as well as under the very high pressure of other systems, and will also operate successfully and without adjustment under the greatly varying pressures to which some water supply systems are periodically subject.

My apparatus avoids the use of objectionable springs, piston packing, friction-generating closely-fitting parts, air checks, and the valve-closing-movement controlling disk is not subjected to water under pressure but merely sinks down through the free water in its cylinder by gravity. The parts of my device are so arranged and constructed as not to be subject to clogging by sediment; the arrangement being such that the flow of flushing water will tend to carry off and prevent deposit of sediment likely to interfere with the free operation of moving parts.

It is evident that various changes, variations and modifications might be resorted to in the forms, constructions and arrangements of the parts described, and hence I do not wish to limit myself to the exact disclosure hereof but consider myself entitled to all such variations and the like falling within the spirit and essence of the following claims.

What I claim is:—

1. Flushing apparatus comprising an elbow casing, the horizontal outlet arm of which is adapted to be coupled with the article to be flushed, an enlarged vertically disposed dome having a water supply inlet at its lower portion, said dome rising from and at its lower end fitted to said inlet end of the casing to discharge thereinto, a vertically movable main-valve normally closing the outlet from and rising in said dome and formed with a longitudinal water passage, a relief valve normally closing said passage, a lifting rod for said main and relief valves arranged to open the same in sequence, said rod depending therefrom into the vertical portion of said casing, a manually operated valve actuating and controlling arm extending laterally in said casing and coupled to said rod, a cylinder depending from said casing and at its upper end opening into the lower portion of the interior thereof, and a disk loosely arranged and vertically movable in said cylinder and coupled to said arm.

2. A flushing apparatus comprising a dome having a water supply inlet and a contracted lower outlet end, an elbow casing having a horizontal arm adapted to be coupled to the article to be flushed and an upright arm at its upper end fitted to said lower end of the dome, a gravity valve normally closing said outlet and provided with pressure relieving means and a lifting rod depending in said casing, manually operated lifting-rod-actuating mechanism, an open-top cylinder depending from said casing and opening thereinto through the bottom thereof, and a disk vertically movable and loosely arranged in said cylinder and provided with a vertical stem extending upwardly into said casing and coupled to said mechanism to control the closing movement of said valve.

3. Flushing apparatus comprising a casing having an annular valve seat, an upright loosely-confined gravity main valve having an enlarged rounded lower end adapted to said seat, said valve having a longitudinal water passage, a relief valve normally seated on said main valve and closing said passage, a vertically-disposed lift rod extending through said passage and laterally movable therein and carrying said relief valve and having means for engaging, tilting and lifting said main valve, and operating and controlling means for said rod.

4. Flushing apparatus comprising an elbow casing consisting of a horizontal arm adapted to be coupled to the article to be flushed and an upright arm, a dome rising from and fixed on the upper end of said upright arm to discharge thereinto and provided with a water supply opening, a gravity main valve normally closing said casing, a pressure relieving valve for said main valve, a lifting rod for said valves depending therefrom in said casing, a vertically swingable rod-actuating and controlling arm normally arranged substantially horizontally in said casing and having exterior actuating means, a vertically movable disk arranged below said arm and having a stem pivotally joined to the free end thereof, and an exterior water cylinder for and loosely receiving said disk and opening at its top into the bottom of the normally empty lower part of said casing.

5. Flushing apparatus comprising a casing having a port surrounded by a valve seat, a vertically-movable laterally-tiltable gravity main valve normally resting on said seat and closing said port and extending upwardly therefrom and having a longitudinal water discharge passage, a vertically-movable tiltable lifting rod passing through said passage and provided with a pressure relieving valve normally closing said passage, said rod provided with means normally spaced from and adapted to move into engagement with and lift and tilt said main valve from the seat, and operating and controlling means for said rod.

6. Flushing apparatus comprising a casing having a port, a gravity main valve normally closing said port and having a water passage extending therethrough and opening into said casing below the valve, a pressure relieving valve vertically movable independently of said main valve and normally closing said passage, a vertically disposed main-valve-lifting rod secured to said relieving valve and depending and vertically movable through said passage, and a horizontally disposed rock shaft having exterior actuating means and provided with a vertically swingable lifting arm fixed thereto and extending therefrom substantially horizontally in said casing and pivotally joined to said rod, said rod being carried vertically and laterally by the vertical swing of said arm, said main valve being rockable and vertically movable with and confined solely by said rod and free to laterally adjust itself to its seat.

7. Flushing apparatus comprising a casing to convey the flushing water to the article to be flushed, a main valve normally closing said casing against the passage of flushing water and provided with pressure relieving means, a vertically disposed lifting rod arranged in said casing for opening said valve and said pressure relieving means and controlling the closing thereof, actuating means operative from the exterior of said casing for lifting said rod to open said valve and relieving means, a water cylinder depending from and at its upper end opening into a normally empty portion of said casing, a vertically movable disk loosely arranged in said cylinder and having a stem extending up into said casing and pivotally coupled with said rod to control the downward movement thereof, the weight of said valve when elevated and of coöperating parts being carried by said disk.

8. Flushing apparatus comprising a casing for conducting the flushing water to the article to be flushed, a valve normally closing said casing against flow of flushing water, a pressure relieving valve, a vertically movable lift rod for opening said valves and controlling the closing movement thereof, a vertically swingable member for actuating said rod and having exterior operating means, a vertically movable disk having a stem pivotally joined to said member, and an open vertical liquid cylinder loosely receiving said disk, the weight of said valves when elevated being sustained by said disk.

9. Flushing apparatus comprising a casing, a main valve normally closing said casing and having a longitudinal water passage, a pressure relieving valve normally closing said passage, a lift rod for said valves having a main valve lifting portion adjustable longitudinally of said rod, manually actuated means for lifting said rod, and mechanism controlling the downward movement of said rod and the closing movement of said valves, said mechanism comprising an open-end cylinder and a disk freely movable vertically therein and connected with said rod and sustaining said valves when elevated and having a normal range of vertical movement of greater length than that of said valves.

10. Flushing apparatus comprising a casing, a gravity main valve normally closing the same and having a longitudinal water passage, a relief valve normally closing said passage, a lift rod for said valves depending through said passage, a manually-operated lifting arm extending laterally in the casing and between its ends coupled to the lower end of said lift rod, the free end of said arm being turned down, a vertically movable disk having a stem extending up into the casing and pivotally joined to said down turned end of said arm, and an open vertical water cylinder loosely receiving said disk.

11. Flushing apparatus comprising a casing having a bottom wall, a water cylinder secured in and depending from said wall with its upper end opening into said casing, said cylinder having a depending sediment pocket, a vertically movable disk loosely arranged in said cylinder and having a depending sediment-agitating pin in and of reduced size with respect to said pocket, said disk having a stem extending upwardly in said casing, a valve normally closing said casing, and manually actuated lifting means for said valve, said means being connected with said stem.

12. Flushing apparatus comprising a casing having a horizontal portion, a vertical water cylinder depending therefrom and opening at its upper end into the botttom of said horizontal portion, a vertically movable beveled edge metal disk loosely arranged in said cylinder and having an upwardly extending rigid stem, a vertically movable valve-lifting arm in the casing and pivotally joined to said stem, a main valve normally closing said casing above said cylinder, valve lifting means coupled to and actuated and controlled by said arm, said arm being pivotally coupled to said means, the weight of said valve when opened and of coöperating parts being on said disk, said disk having a greater range of vertical movement than said valve.

13. Flushing apparatus comprising a casing, a vertically-movable main valve normally closing the same and having a water passage therethrough, a pressure relieving valve normally closing said passage, a vertically-movable lifting rod for lifting said valves in sequence to open the same, lever mechanism for actuating said rod and controlling the downward movement thereof, a liquid cylinder, a freely vertically movable disk therein connected with said mechanism to control the downward movement of said rod and the closing movement of said valves, said disk sustaining said valves and coöperating parts when elevated and settling through the liquid in said cylinder by gravity, the range of vertical movement of said disk being greater than that of said valves, substantially as described.

14. Flushing apparatus comprising a casing, a vertically movable gravity valve normally closing said casing, a lift rod for elevating said valve and controlling the closing movement thereof, a stop limiting the opening movement of said rod and valve, the downward movement of said rod being limited by the engagement of said valve and its seat, lever mechanism for elevating said rod and valve and controlling the downward movement of said rod, mechanism controlling the closing movement of said valve through the medium of said lever mechanism and rod and comprising a liquid cylinder and a disk freely movable vertically therein and connected with said lever mechanism and when said valve is open sustaining the weight thereof and of coöperating parts and settling through the liquid in said cylinder by gravity, the normal range of vertical movement of said disk being greater than that of said valve, the downward movement of said disk being limited by the engagement of said valve and its seat.

15. Flushing apparatus comprising a casing having a valve seat, a vertically movable valve normally resting on said seat to close said casing, means for lifting said valve to open position and controlling the closing movement thereof comprising lever mechanism and means for adjusting the relative vertical position of said valve with respect to said lever mechanism for varying the limit of upward movement of said valve and consequently the length of the stroke thereof, without varying the limit of upward movement of said lever mechanism, and mechanism controlling the closing movement of said valve comprising a cylinder, and a disk movable longitudinally therein and coupled to said lever mechanism and having a range of movement in excess of that of said valve and limited in its downward movement by the engagement of the valve and its seat.

16. Flushing apparatus comprising a casing terminating in an enlarged dome, a bodily vertically-movable laterally-tiltable valve normally closing said casing and rising in and of reduced size with respect to said dome, pressure relieving means for said valve, laterally-swingable vertically-moving lifting means for said valve and relieving means to tilt and elevate the same to open position, actuating mechanism for said lifting means for elevating and tilting the same, and means limiting the lateral swing of said lifting means to prevent said valve when elevated from engaging with adjacent walls.

17. Flushing apparatus comprising a casing, a vertically-movable gravity valve normally closing the same, swinging actuating mechanism for opening said valve and controlling the closing movement thereof, and mechanism comprising a depending liquid cylinder opening at its upper end into a lower portion of said casing normally emptied of water, and a rockable rounded-edge disk loosely arranged and vertically movable in said cylinder and coupled to said actuating mechanism to control the closing movement of said valve, said disk having a normal vertical range of movement greater than that of said valve and sustaining the weight of said valve and coöperating parts when said valve is elevated and slowly settling by gravity through the liquid in said cylinder.

18. Flushing apparatus comprising a casing, a vertically-movable valve normally closing the same, valve actuating mechanism for lifting and opening the valve, and mechanism controlling the closing movement of said valve and comprising a vertical water cylinder opening at its upper end into said casing and an imperforate disk loosely-arranged and vertically-movable in said cylinder and pivotally coupled to said valve actuating mechanism and having a normal range of vertical movement greater than that of said valve and sustaining said valve when elevated and dropping by gravity through the water in said cylinder during the closing movement of said valve.

19. Flushing apparatus comprising a casing having a normally empty horizontal portion, a vertically movable valve normally closing said casing against flushing flow of water, valve actuating mechanism for lifting and opening said valve, and mechanism controlling the closing movement of said valve and comprising a vertical water cylinder opening at its upper end through the floor of said horizontal portion, and a loosely-arranged and vertically movable disk in said cylinder pivotally coupled to said actuating mechanism to carry the weight of said valve and actuating mechanism when said valve is elevated and to slowly sink by gravity through the water in said cylinder as the valve closes and having a range of vertical movement in excess of that of the valve.

20. Flushing apparatus comprising a casing, a laterally-tiltable loosely-confined gravity-closing valve normally held at its limit of downward movement closing said casing against flushing flow of water and having a pressure relieving passage, pressure-relieving means normally closing said passage, depending vertically-movable laterally-tiltable lifting means for lifting and opening and controlling the closing movement of said relieving means and valve in sequence, and loosely confining said valve and tilting and elevating the same in opening, vertically movable actuating mechanism for said lifting means coupled thereto to elevate and tilt the same and controlling the downward movement thereof, and slow-moving means controlling the closing movement of said valve and relieving means through the medium of said actuating mechanism and lifting means.

In testimony whereof I affix my signature, in presence of two witnesses.

LEO SIMMONS.

Witnesses:
HUBERT E. PECK,
W. N. WOODSON.